United States Patent [19]

Vantine

[11] Patent Number: 4,796,307
[45] Date of Patent: Jan. 10, 1989

[54] EAR PROTECTOR

[76] Inventor: Kurt Vantine, 105 E. Fairmount Ave., Maywood, N.J. 07607

[21] Appl. No.: 24,989

[22] Filed: Mar. 12, 1987

[51] Int. Cl.⁴ .............................................. A42B 1/06
[52] U.S. Cl. ................................................ 2/209; 2/13; 2/423; 2/DIG. 11; 351/158
[58] Field of Search ............. 2/13, 209, 423, DIG. 11, 2/451, 199, 185 R, 171; 351/158; 379/430

[56] References Cited

U.S. PATENT DOCUMENTS

| 280,005 | 6/1883 | Beard et al. | 2/209 X |
|---|---|---|---|
| 836,087 | 11/1906 | Callahan | 2/209 |
| 2,113,992 | 4/1938 | Lochner | 2/209 UX |
| 2,333,392 | 11/1943 | Rosenzweig | 2/209 |
| 3,087,028 | 4/1963 | Bonnin | 2/209 |
| 4,298,991 | 11/1981 | Recenello | 2/13 |
| 4,398,306 | 8/1983 | Gooding | 2/421 |
| 4,471,496 | 9/1984 | Gardner, Jr. et al. | 2/209 |
| 4,632,104 | 2/1986 | Conrow | 2/13 |

FOREIGN PATENT DOCUMENTS

| 0611274 | 10/1960 | Italy | 2/451 |
|---|---|---|---|
| 0200837 | 1/1939 | Switzerland | 2/209 |

Primary Examiner—Peter Nerbun
Attorney, Agent, or Firm—Bacon & Thomas

[57] ABSTRACT

An ear protector for protecting the ear against impact from a ball during the playing of racquet and handball sports, the protector including a ventilated cup-like cap member carried by a suspension means for adjustable engagement over the ear, and a clip for detachably securing the cap member to a headband.

1 Claim, 1 Drawing Sheet

U.S. Patent
Jan. 10, 1989
4,796,307
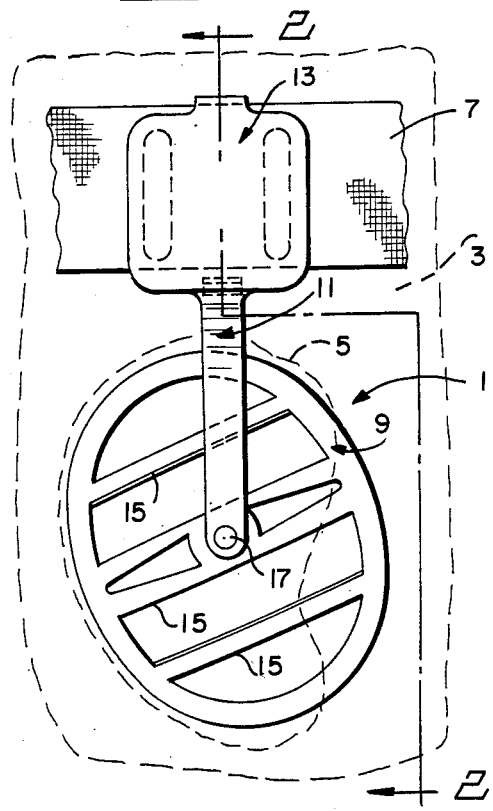
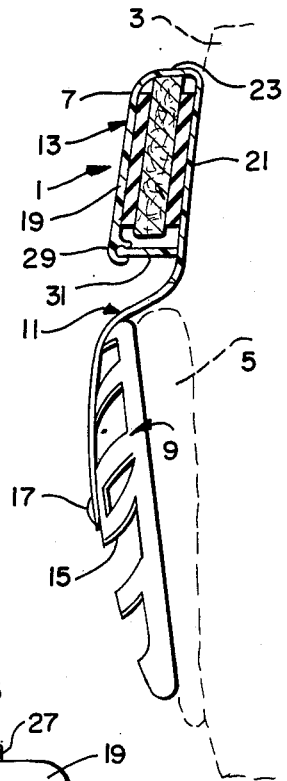
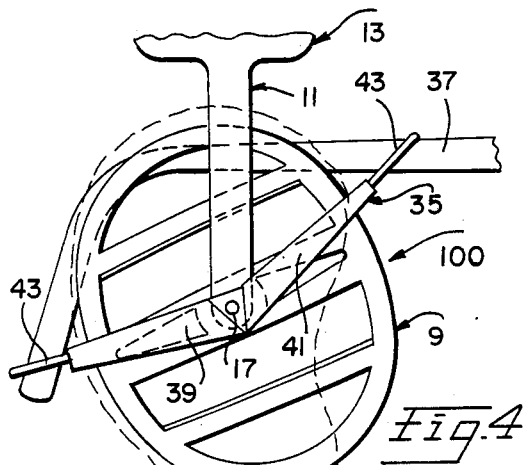
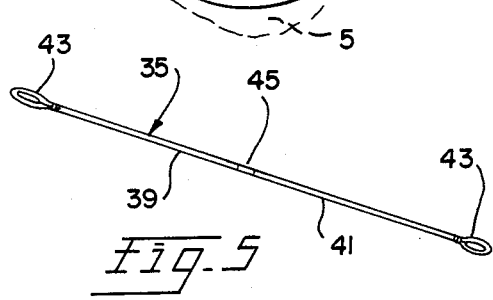
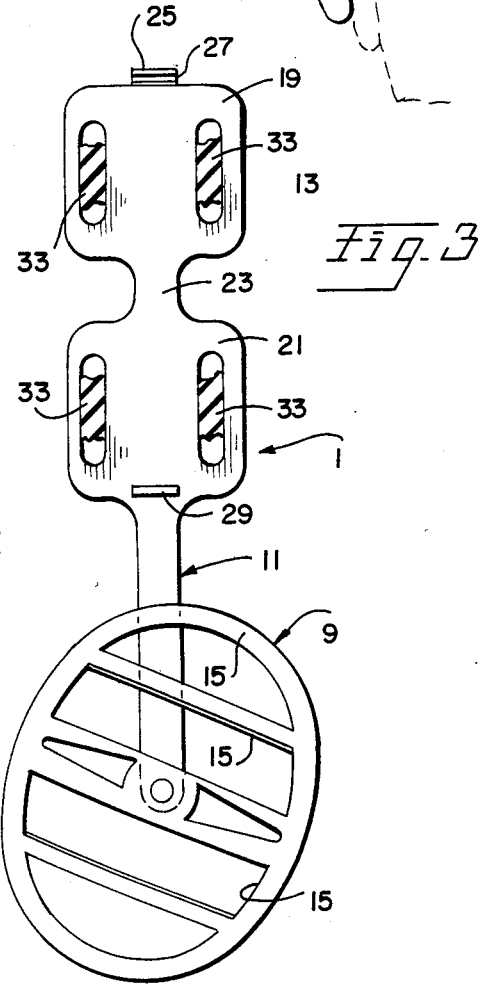

EAR PROTECTOR

BACKGROUND OF THE INVENTION

1. Field of the Invention

The present invention generally involves the field of technology pertaining to protective body wear for use in preventing injuries during the playing of sports. More particularly, the invention relates to an improved device for protecting the ear against the impact of a ball during the playing of ball sports, such as racquetball, squash and handball.

2. Description of the Prior Art

The concept of providing a device for protecting the human ear from injury during the playing of various sports, such as wrestling, baseball, motorcycling and other sports in which the ear is vulnerable to physical impact, is well documented by the prior art. The contemporary interest in certain ball sports, such as squash, racquetball and handball, wherein a ball is struck by a racquet or the hand of a player at high speeds has presented the problem of serious injury if the ball impacts against the unprotected ear of the player. There has arisen a need for an appropriate ear protector for use during the playing of these ball sports wherein such a device must afford maximum protection, be comfortable to wear, and does not interfere with the playing of the sport.

Heretofore known ear protectors are quite specialized in their physical construction for the specific sport with which they are intended to be utilized. For example, an ear protector designed for protecting the ears of a wrestler is generally in the form of a complex head gear having plural straps which securely maintain cup-like protectors over the ears and prevent the inadvertent shifting or removal of the protectors during wrestling. It is also known to provide motorcycle helmets with ear protectors which are specifically designed for attachment to the helmet and cover the ears when the helmet is worn. However, such known devices are not adaptable for protecting the ear during the playing of racquet or handball sports.

Some examples of known ear protectors, including those of the aforementioned type, are disclosed by the Knight U.S. Pat. No. 674,272; Gaston et al U.S. Pat. No. 1,826,309; Dolder U.S. Pat. No. 1,909,856; Rosenzweig U.S. Pat. No. 2,333,392; Rosenblatt U.S. Pat. No. 2,361,963; Leeming U.S. Pat. No. 2,545,552; McCoy U.S. Pat. No. 2,861,270; Roberts U.S. Pat. No. 2,886,818; Molitoris U.S. Pat. No. 3,497,874; French U.S. Pat. No. 4,538,034; and Strong British Pat. No. 356,552.

SUMMARY OF THE INVENTION

It is therefore an object of the present invention to provide an improved device for protecting the human ear against injury caused by the impact of a projectile, such as a ball during the playing of various sports.

It is another object of the invention to provide an improved ear protector that is particularly advantageous for protecting the ear during the playing of racquetball, squash, handball and the like.

It is a further object of the invention to provide an improved ear protector which is lightweight, comfortable to use, adjustable to the ear of the wearer and does not impair hearing when worn.

It is yet another object of the invention to provide an improved ear protector which is simple in construction, reliable in use and extremely durable.

These and other objects of the invention are realized by providing an ear protector which comprises a substantially cup-shaped cap member that is configured and sized for covering the ear. The cap member is provided with a plurality of openings, preferably in the form of slots, which permit ventilation and sound transmission therethrough. The cap is supported over the ear by a flexible suspension member having one end pivotally connected to the central portion of the cap member so that the latter may be rotated for angular adjustment to the position of either ear. The other end of the suspension member is provided with a clip for detachable connection to a headband or similar appliance worn by the user.

The protector may also be provided with means for securing each cap member to a temple of an eyeglass frame in order to accommodate users who are required to wear eyeglasses.

Other objects, features and advantages of the invention shall become apparent from the following detailed description of preferred embodiment thereof, when considered in conjunction with the drawings wherein like reference characters refer to corresponding parts in the several views.

BRIEF DESCRIPTION OF THE DRAWINGS

FIG. 1 is a front elevational view of an ear protector according to a first preferred embodiment of the invention shown in a position of use supported on a headband and covering an ear of the user;

FIG. 2 is a side elevational view, partly in section, taken on the staggered line 2—2 of FIG. 1;

FIG. 3 is a plan view showing the ear protector with its clip in an open position;

FIG. 4 is a front elevational view, partly in section, of an ear protector according to a second embodiment of the invention wherein means are provided for securing the cap member to a temple of an eyeglass frame; and FIG. 5 is a side view of the temple securing means shown in FIG. 4.

DETAILED DESCRIPTION OF THE PREFERRED EMBODIMENTS

An ear protector 1, according to a first embodiment of the invention, is shown in FIGS. 1 and 2 in a position of use supported on the head of a user, shown generally at 3, and covering an ear, shown generally at 5. Protector 1 is supported on a headband 7 or other similar appliance encircling head 3 of the user.

Protector 1 is essentially defined by a cup-shaped cap member 9, a suspension member 11 and a retainer clip 13. Cap member 9 is configured to fit over ear 5 and preferably molded from plastic material. Cap member 9 is also provided with a plurality of openings 15 therethrough for the dual purpose of providing ventilation to ear 5 and permitting sound transmission through cap member 9. Openings 15 may generally be in the form of wide parallel slots as shown in FIG. 1.

Suspension member 11 is in the form of a flexible elongate strap, preferably molded from plastic material, so that it may easily conform to the external curvature of both cap member 9 and ear 5, as shown in FIG. 2. The lower end of member 11 is attached to the central portion of cap member 9 by an appropriate pivot connection 17 which permits cap member 9 to rotate with respect to suspension member 11 and thereby conform to the angular disposition of ear 5. The upper end of suspension member 11 is joined to retainer clip 13, with both member 11 and clip 13 being preferably integrally formed from plastic material through injection molding or other known forming process.

The details of retainer clip 13 shall now be described with reference to FIG. 3. As shown therein, clip 13 includes a first plate 19 and a second plate 21, with plates 19 and 21 being of corresponding size and configuration and joined by a hinge section 23. In this way, first plate 19 may be folded on top of second plate 21 to enclose headband 7 therebetween, as particularly shown in FIG. 2. First plate 19 includes a tab 25 provided with a longitudinal recess 27 therein. Recess 27 has a substantially cylindrical configuration for receiving a correspondingly shaped longitudinal rib 29 supported on the end of a second tab 31, as seen in FIG. 2, carried by second plate 21. Thus, plate 19 may be retained in a folded position over plate 21 by snap fitting rib 29 within recess 27. It is also preferred that the inner opposed surfaces of plates 19 and 21 be provided with opposed gripping means 33 in order to prevent clip 13 from sliding with respect to headband 7 during use of protector 1. Gripping means 33 is preferably in the form of plural strips of rubber or similar friction members adhesively attached to the inner surfaces of plates 19 and 21 as shown in FIG. 3.

Suspension member 11 and retaining clip 13 may be integrally injection molded from polypropylene or other suitable polymer plastic having lightweight, high strength and particular durability under repeated flexing and required for hinge section 23. Cap member 9 may also be injection molded from the same plastic or any other type of material deemed appropriate for the practice of the invention as disclosed herein. Pivot connection 17 may be of any conventional metal or plastic connection which preferably permits rotation of cap member 9 with respect to suspension member 11 and also permits cap member 9 to be retained in a desired position of rotation.

An ear protector 100 according to a second embodiment of the invention shall now be described with reference to FIG. 4. As shown therein, protector 100 is similar to protector 1 of the first embodiment in its inclusion of cap member 9, suspension member 11 and retaining clip 13. However, in the instant embodiment, cap member 9 is provided with a securing member 35 for the purpose of securing cap member 9 to a temple 37 of an eyeglass frame. Member 35 is preferably of an elongate configuration and defined by a pair of arms 39 and 41, the terminal ends of which are provided with a pair of loops 43 for engaging temple 37. As is apparent from FIG. 4, arms 39 and 41 may be disposed in any desired angle with respect to each other in order to accommodate temples of different configurations. Member 35 is preferably secured to cap member 9 by pivot connection 17, or in any other manner deemed suitable for the practice of the invention as described herein.

As shown in FIG. 5, securing member 35 is preferably of a flat strip configuration and provided with an aperture 45 through which pivot connection 17 may be inserted. Loops 43 are preferably formed of elastic material to permit their snug engagement around temple 37, and also to accommodate temples of different sizes. Arms 39 may also be formed of elastic material or any other suitable material known in the art.

It is to be understood that the embodiments of the invention herein shown and described are to be taken as preferred examples of the same, and that various changes in shape, size, arrangement of parts and composition may be resorted to without departing from the spirit of the invention or scope of the subjoined claims.

I claim:

1. An ear protector for use with a headband or similar appliance, which protector comprises:
   (a) a cap member of sufficient size and shape for covering an ear;
   (b) suspension means including first and second ends;
   (c) means pivotally connecting the cap member to the first end of the suspension means for permitting the adjustable positioning of the cap member with respect to the disposition of the ear;
   (d) means for attaching the second end of the suspension means to a headband; and
   (e) means for securing the protector to the temple of an eyeglass frame, which securing means includes arms attached to the cap member, each arm having a free end, and means carried at each free end for detachably securing same to the temple.

* * * * *